United States Patent

Mitsutoshi et al.

Patent Number: 5,138,139
Date of Patent: Aug. 11, 1992

[54] PIPE IDENTIFYING APPARATUS

[75] Inventors: Nishida Mitsutoshi; Nosaka Masaaki, both of Hirakata, Japan

[73] Assignee: Matsui Manufacturing Co., Ltd., Osaka, Japan

[21] Appl. No.: 568,096

[22] Filed: Aug. 14, 1990

[51] Int. Cl.$^5$ .............................. G06F 15/20
[52] U.S. Cl. ........................ 235/375; 235/464; 235/472
[58] Field of Search .............. 235/464, 472; 250/566; 364/482

[56] References Cited

U.S. PATENT DOCUMENTS 3,931,524  1/1976  Herrin ................................ 250/566
4,764,879  8/1988  Campbell ........................ 235/464 X
4,902,244  2/1990  Endo et al. ...................... 235/464 X Primary Examiner—Harold Pitts
Attorney, Agent, or Firm—Koda and Androlia

[57] ABSTRACT

The present invention is directed to a pipe identifying apparatus in use for a pneumatic force type device for transporting powdered materials, a dryer and the like. The pipe identifying apparatus comprises a plurality of magnetic rings and non-magnetic rings which magnetic rings and non-magnetic rings form specific identifying codes for each of a plurality of pipes and proximity switches provided on the side of receiving part of the pipe and associating with the magnetic rings to form a magnetic circuit, so that the magnetic circuit is closed to generate electric signals between each proximity switches and each of the plurality of magnetic rings and non-magnetic rings, thereby identifying specific connected pipes by means of the generated electric signals.

5 Claims, 9 Drawing Sheets

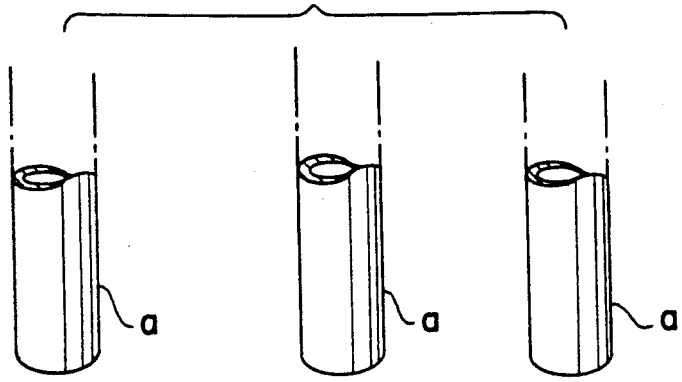
FIG. 7
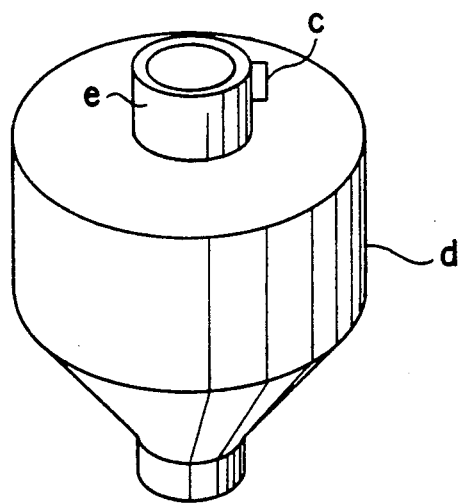

PIPE IDENTIFYING APPARATUS

BACKGROUND OF THE INVENTION

1. Field of the Invention

The present invention relates to an apparatus for identifying material transporting pipes which ar used in the apparatuses including a pneumatic force type device for transporting powdered or granular materials (hereinafter referred to simply as materials), raw materials for plastic, medicine, processed food and the like, by means of sucking or pressuring-feeding transport gas such as air and the like, a dryer for drying the material down to the desired moisture percentage, and a die temperature controller in a synthetic resin molding machine, or pipes which feed/return heating medium, more specifically to pipe identifying apparatus, in use for the pneumatic force type device for transporting the materials, which detects and identifies whether or not the pipes having been connected to receiving parts thereof are desired ones, when connecting a plurality of adequately selected pipes thereto.

2. Prior Art

The examples of the conventional pipe identifying apparatus are: As the first example, as shown in FIG. 7, an arrangement is known in which a switch c such as proximity switch is provided on the receiving part e of one material reservoir d, whereby a connection of the pipe a is confirmed by an action by the switch c, when inserting one optionally selected pipe a among a plurality of pipes a, a, . . . for transporting the materials of a different kind.

Also as the second example, as shown in FIGS. 8 and 9, an arrangement is known in which connection tubes b are connected to a plurality of pipes a, a, . . . respectively for transporting the materials of a different kind, and the switch c is provided on each of the connection tubes b, whereby, when connecting the adequately selected connection tube b is connected to the receiving part e of the one material reservoir d, it is enabled to confirm by way of a lead wire f from the outside not only whether or not the connection state is proper but also a classification of the connected pipe a by means of a corresponding actuation of the switch c.

There may be sometimes found case in the first conventional example, where since although a completion of connecting the pipe a to the receiving part e can be confirmed, whether or not the connected pipe is the desired one a cannot be identified, an erroneous connection of the pipe a other than the desired one thereto takes place.

If the pipe a other than the desired one is errorneously connected to the receiving part e, the undesired materials and heating medium result in being transported into the material reservoir d. There may, for example, take place problematic point that in the plastic molding, the materials other than the desired materials to be molded ma be transported to the synthetic resin molding machine.

On the other hand, the second conventional example may incur a problematic point that although the aforementioned problem in the first example can be solved, in addition to the requirement that the switches c and the lead wires c whose quantity is equal to the number of connection tubes b, i.e. the actual number of pipes a are needed, an increase in the actual number of lead wires f, made proportionally to an increase in the actual number of tubes a, complicates a wiring of the lead wires f, f, . . . as well as makes it unavoidably difficult to fabricate a control panel into which the lead wires f, f, . . . are concentrated as small as possible.

The present invention is to provide the pipe identifying apparatus in use for the transportation of the powder materials by the pneumatic force, the apparatus solving all of the afore-mentioned problematic points in the first and second conventional examples.

SUMMARY OF THE INVENTION

The present invention is in a position to detect an trouble in connecting errorneously the pipe other than the desired one to the receiving part of the piping, for example, in use for the pneumatic force type device for transporting the materials upon completion of connecting the pipe to the receiving part prior to the transportation of the materials. Namely, the primary object of the present invention is to provide the pipe identifying apparatus, in use, for example, for the pneumatic force type device for transporting the materials, capable of avoiding completely such a problem involved in the erroneous connection of the pipe as stated in the first conventional example.

Another object of the present invention is to provide the afore-mentioned pipe identifying apparatus in which since the switches and the lead wires, equal in quantity to the actual number of wires as stated in the second conventional example, are not needed, the wiring of the lead wire being performed easily, a piping work and an electrical work at the installation of the pipes can be separately performed so that both the works can be performed individually or at the same time.

A further object of the present invention is to provide the afore-mentioned pipe identifying apparatus in which since the identification of the pipes is coded, even increase in the actual number of pipes does not cause the number of input processes into a reader and the control panel to be proportionally increased, whereby making the control panel as small as possible.

A still further object of the present invention is to provide the aforementioned pipe identifying apparatus in which a construction of being possible to change the identifying code optionally to other code enables one pipe to be utilized as a plurality of pipes which have different identifying codes.

Other objects, characteristics, and advantageousness of the present invention shall become apparent from the following description:

In order to attain the afore-mentioned objects, the present invention takes an arrangement in which a plurality of magnetic rings and non-magnetic rings, which form specific identifying codes for each of a plurality of pies, are heaped up in respective positions in the longitudinal direction of the pipe or a connection instrument removably connected to the pipe, and proximity switches provided on the connection instrument and associating with the magnetic rings to form a magnetic circuit, so that the magnetic circuit is closed to generate electric signals between each proximity switches and each of the plurality of magnetic rings and non-magnetic rings forming the identifying codes, thereby identifying specific connected pipes by means of the generated electric signals.

The pipe, being not optionally limited to ones made of metal, or synthetic resin and the like, may be optional in selecting a tube and a hose without care about its shape, material and size. In addition, a range of passing the material through the pipe, being not particularly limited, includes a transportation of the materials by means of the pneumatic force, a circulation of other medium and the like.

The reader is a proximity sensor which detects a connecting of the pipes and output on-off signals, and the signals are inputted into a signal processing means. The information previously stored in the signal processing means is accommodated to indicate digital or analog signals which are the identifying code of the pipe connected to the side of the receiving part or name of the material passing through the pipe on a known display means but also of providing an alarm means (lamp, buzzer and the like) in place of the display means and a comparator (microcomputer and the like) at the same time, whereby, as soon as the identifying code of the pipe connected to the side of the receiving part is detected, the comparator makes a comparator makes a comparison between a desired identifying code which has been set in the comparator in advance and the former identifying code so that if there is no coincidence therebetween, the alarm means allows an alarm to be issued. Furthermore, the detection switch, being connected to other related control panel (e.g. control panel for pneumatic force source of the pneumatic force type device for transporting the materials), can be controlled in contact with a controlling of the related instrument.

The identifying code is formed by a plurality of the magnetic and non-magnetic rings that can be changed in position so that the identifying code can output various kinds of identifying codes. Furthermore, the identifying code can also be formed by a plurality of magnetic rings which are integrated to the outer circumference of the connection instrument with spaced in between such that the position of the magnetic rings is different from that of other connection instruments, thus causing each identifying code to output different identifying codes from other identifying code. While the identifying code may be provided directly every each of the pipes, such an indirect provision of the identifying code as mounted to a connection tool provided on one end side of each of the pipes is also possible. The identifying code may be optional in being set every kind and quality of the pipe or material passing through the pipe, being able to be optionally changed to other identifying code of a different design.

According to the present invention having the aforementioned construction, upon completion of connecting the seemingly desired pipe to the side of the receiving part provided on the material reservoir, for example, in the pneumatic force type device for transporting the materials, the reader provided on the side of the receiving part detects (discriminates) at once the identifying code inherent in the connected pipe and the display means allows the number of such a pipe to be displayed, thereby enabling a identification of the pipe to be made.

When connecting erroneously the pipe other than the desired one to the side of the receiving part, since such an erroneous connection can be recognized by way of the display means and the alarm means by the identifying code and the reader, the erroneous connection of the pipe may be prevented.

BRIEF DESCRIPTION OF THE DRAWING

FIGS. 1 to 6 illustrate embodiments of the present invention in which:

FIG. 1 is a longitudinal sectional view of a principal part of the first embodiment.

FIGS. 2-(A) to 2-(H) are outline views illustrating examples of installing the identifying codes.

FIG. 3 is a plan view of FIG. 1.

FIG. 4 is a longitudinal sectional view of a principal part of the second embodiment.

FIGS. 5 and 6 are longitudinal sectional views of modified examples of ring articles respectively of FIG. 4.

FIG. 7 is an exploded perspective view of the first conventional example.

DETAILED DESCRIPTION OF THE INVENTION

Figure 3:
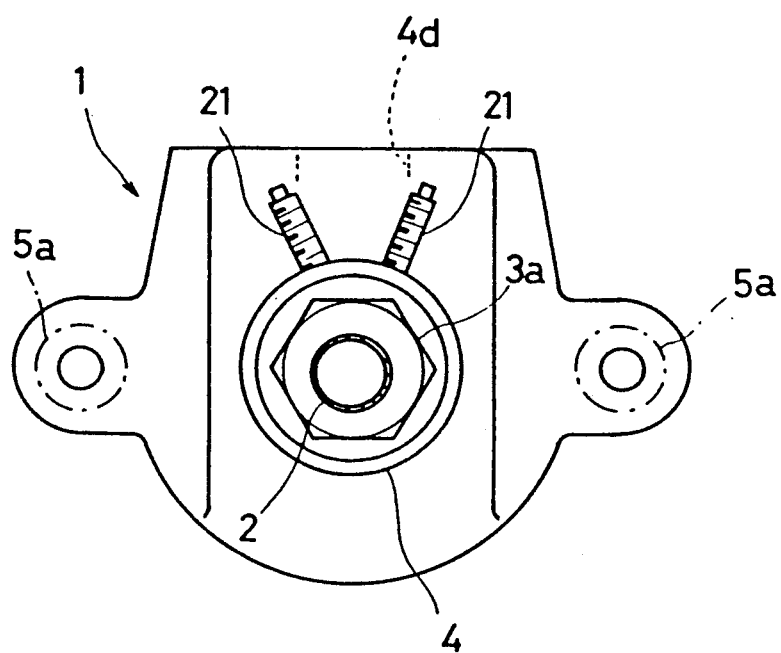

A description of the first embodiment of applying the present invention to the pipe in use for the pneumatic force type device for transporting the materials is made in conjunction with FIGS. 1 to 3 as follows:

1 is the pipe identifying apparatus, which includes a plurality of pipes 2, 2, . . . having connection instruments 3, 3, . . . of pipe-shape or other adequate shape fixed to their top ends by means of sleeve-shaped fastening members 3a, 3a, . . . , identifying codes 10, 10, . . . being individually provided on the connection instruments 3, 3, . . . , and the reader 20 for detecting each of the identifying codes 10, 10, . . . provided on the side of the receiving part 4 of the pipe 2.

The connection instrument 3 has a part 3c of outer diameter smaller than that of a base end side 3b located at its top end side a little distant from its central part, a stage part 3d being interposed between the base end side 3b and the part of smaller outer diameter 3c. A cylindrical insertion hole 4a is made in the receiving part 4, which is fixed to be part to be connected 5, such as a hopper and the like, by means of a bolt 5a, and a separation chamber 4b is provided integrally to the lower part of the insertion hole 4a. The connection instrument 3 is inserted from the insertion hole 4a to the separation chamber 4b and is fixed to the upper part of a side wall 4c of the receiving part 4 by means of a bolt 6. Loosening of the bolt 6 will enable not only the connection instrument 3 to be removed together with the pipe 2 but also a replacement with other adequate connection instruments 3, 3, . . . to be performed in a manner of connecting/detaching them.

2a is a pipe line and all of 7 and 7a are packings. 8 is a mounting cylinder which is not always indispensable. A slit S is formed between the mounting cylinder 8 and the connection instrument 3, causing a group of dust and gas and the materials to be transported to be separated from one another: the dust and the gas are adapted to be discharged from an exhaust port 4d to the outside, while the materials to be transported are adapted to drop into the part to be connected 5 which is located under the mounting cylinder 8. A limit to such a construction is not always absolute, its design being adequately changeable.

Under the present embodiment, an adoption of the proximity switch 21 as the reader 20 requires a construction of the identifying code 10 to comprise an optional number (7 units under this embodiment) of ring articles 11 of 2 kinds including magnetic rings 11a, made of such magnetic materials as metal and the like, and non-magnetic rings 11b, made of such non-magnetic materials as synthetic resin and the like.

Figure 1:
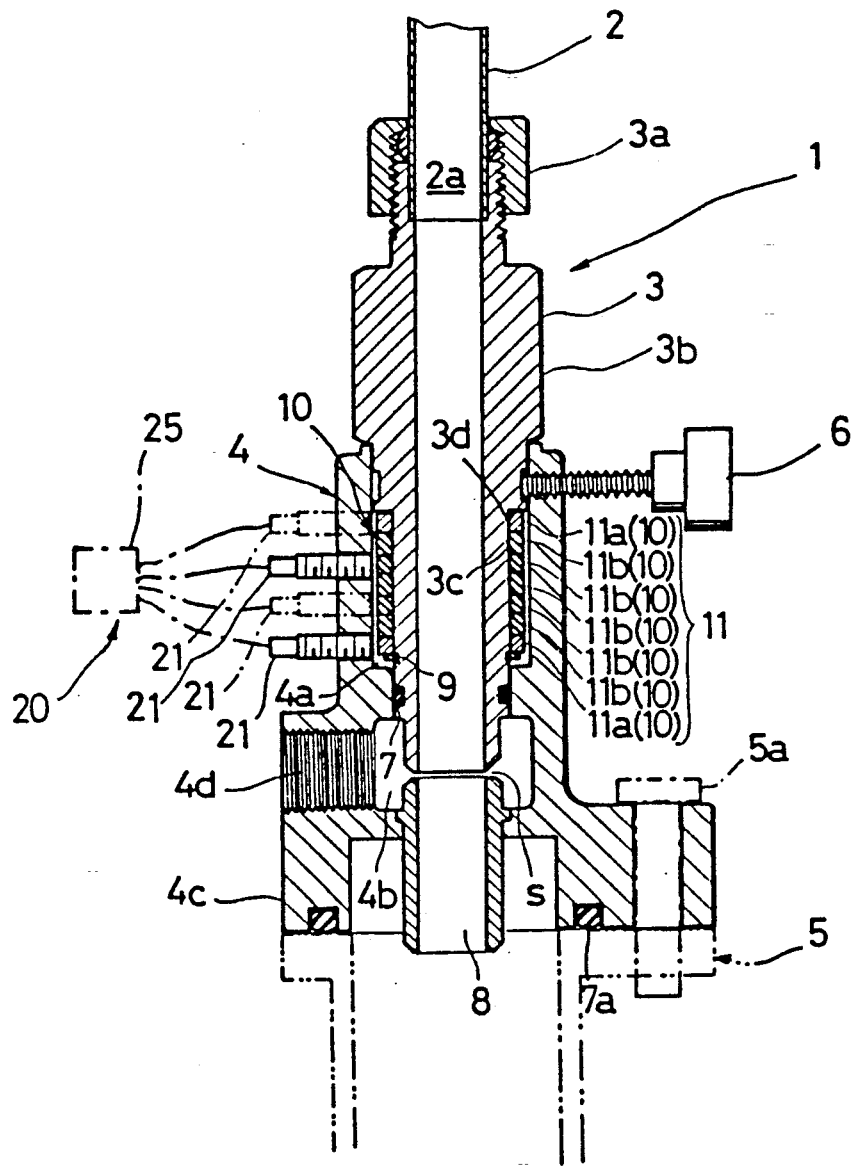
Figures 2A, 2B:
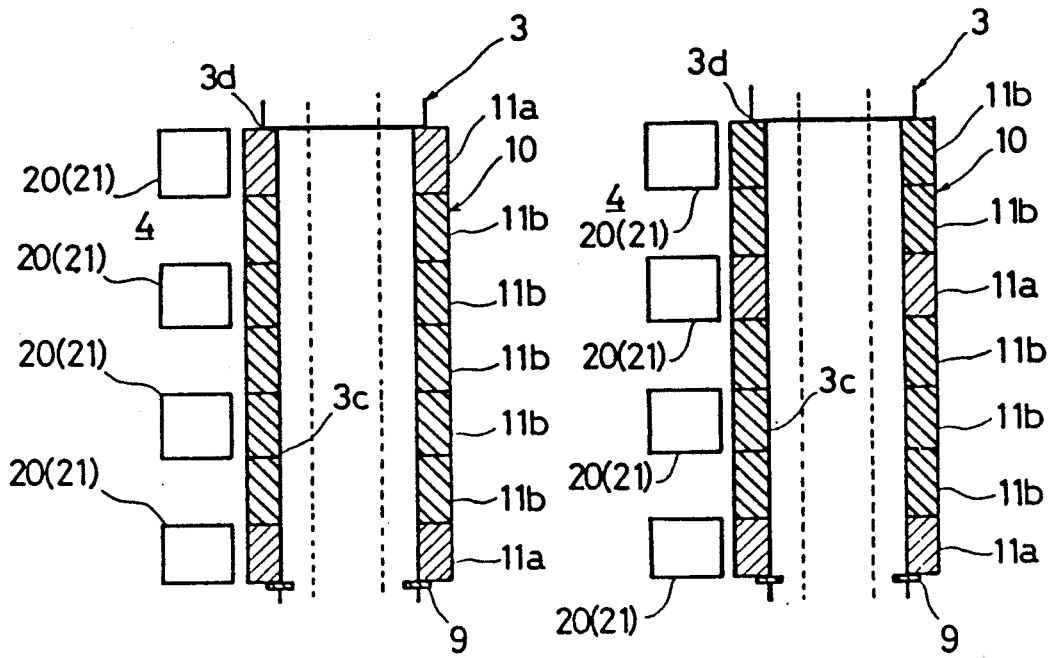
Figures 2C, 2D:
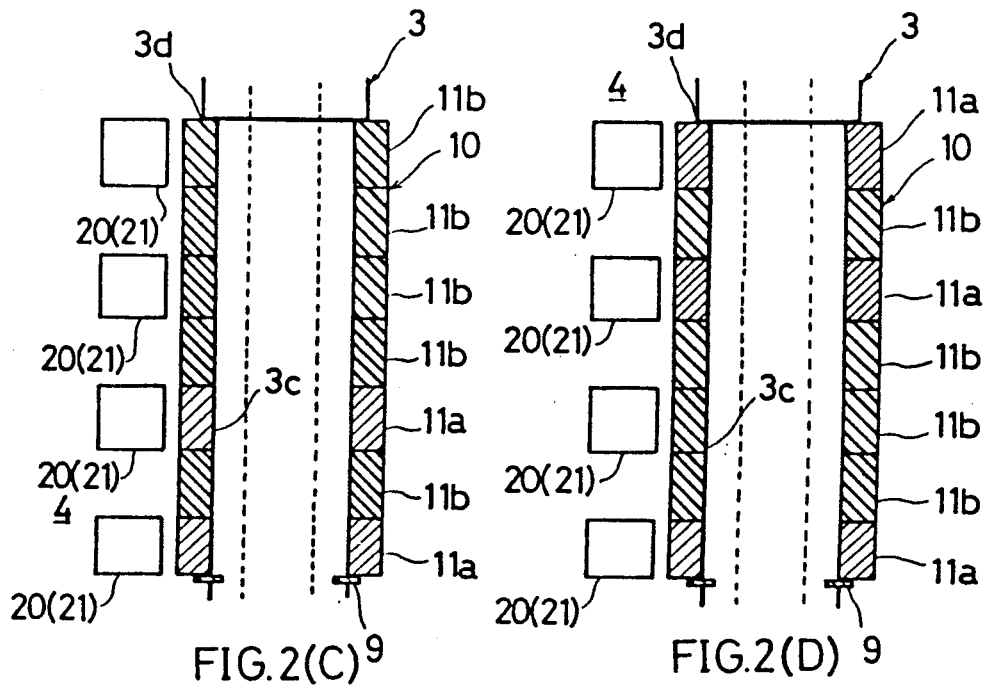
Figures 2E, 2F:
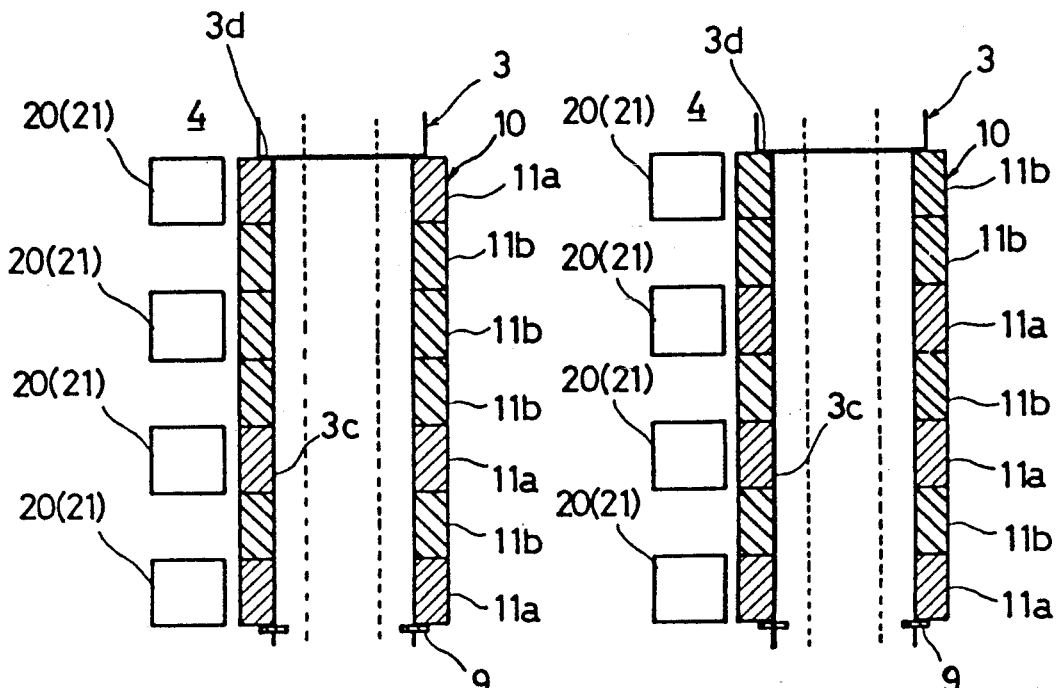
Figures 2G, 2H:
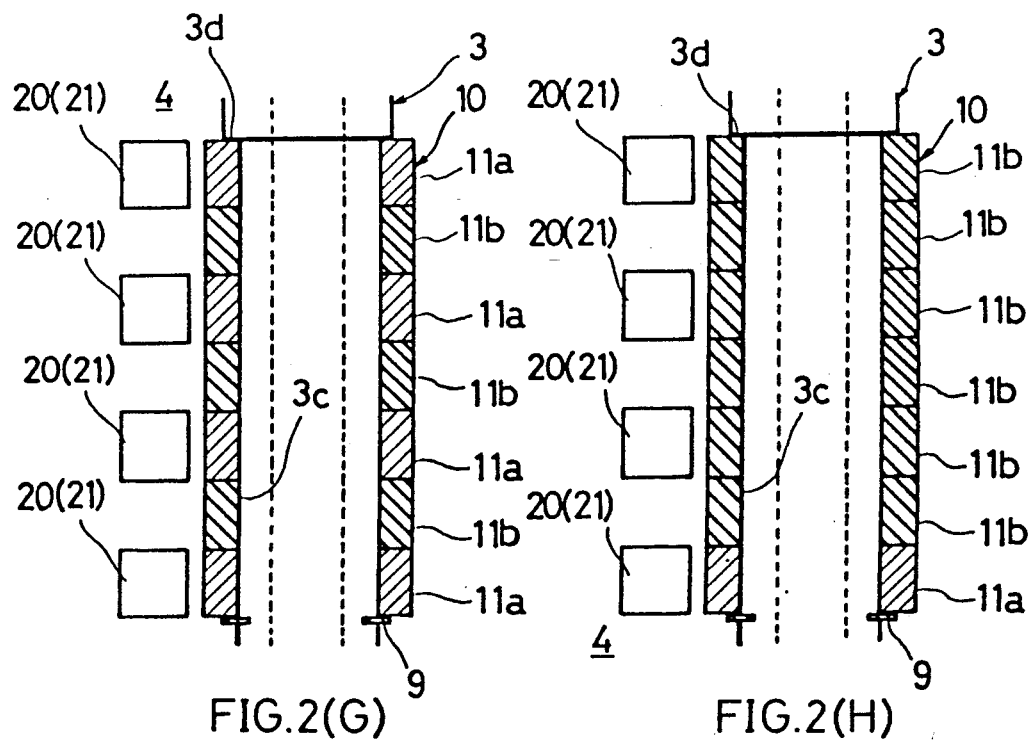

As shown in FIG. 1, the afore-mentioned 7 units of ring articles 11, 11, ... are fixedly interposed between the stage part 3d and a snap ring 9. As mentioned shortly, a change in the order of 7 units of ring articles 11, 11 ..., made after removing the snap ring 9, will easily enable the identifying code to be changed.

4 units of proximity switches 21, 21, ..., acting as a role of the reader 20, are fixedly screwed to the side wall 4c of the receiving part 4 such that each of them corresponds alternately to the 1st ring article 11, the 3rd one, the 5th one, and the 7th one from the above of an order of ring articles 11, 11, ... under a state (FIG. 1) where the connection instrument 3 is connected to the receiving part 4. All of the 2nd ring article 11, the 4th one, and the 6th one are non-magnetic rings 11b, 11b, ... Under such an arrangement, since each of proximity switches 21, 21, ... is provided correspondingly alternately to a line of odd-numbered ring articles 11, 11 ... and all the resting ring articles 11, 11, ... comprise the non-magnetic rings 11b, 11b, ... which cannot be detected by the proximity switches 21, 21, ..., it can be avoided that the proximity switch 21 detects erroneously the upper-sided or lower-sided ring article 11 other than the ring articles 11, 11, ... to which each of the proximity switches 21, 21, ... corresponds alternately.

FIGS. 2-(A) to 2-(H) illustrate the identifying code 10 which is ready for being set under the present embodiment. Pulling-out of all the ring articles 11, 11, ... from the part under the connection instrument 3 after removing the snap ring 9 will freely rearrange an order of the magnetic ring 11a and the non-magnetic ring 11b, thereby making it possible to set various kinds of identifying codes 10, 10, ....

In FIGS. 2-(A) to 2-(H), since all the 7th (lowest) ring articles 11 comprise the magnetic rings 11a for confirming a complete connection between the connection instrument 3 and the receiving part 4 and, as mentioned above, all of the 2nd ring article 11, the 4th one, and the 6th one comprise the non-magnetic rings 11b, substantially, the identifying code 10 is determined by a repeated permutation between the magnetic rings 11a and the non-magnetic rings 11b, all of which constitute 3 units of the 1st ring article 11, the 3rd one, and the 5th one. Namely, under the present embodiment the identifying code 10 which can be set may be classified into $2^3$ kinds resulting from the permutation being obtained by a selection of 3 positions (each of which is optionally located at any of the 1st ring article 11, the 3rd one, and 5th one with their repeated assortment being allowed) of the magnetic rings 11a and the non-magnetic rings 11b so that if such a selection can be verified into n units of modes, $2^n$ kinds of identifying codes can be set.

It is also possible to provide a signal processing means 25 on the reader 20. The signal processing means 5, being not always indispensable, takes a construction in which while it is connected to the detection switches such as the proximity switches 21, 21, ..., and receives a signal of the identifying code 10 being detected by the proximity switch 21 and the like, it makes a comparison between the identifying code of the desired pipe, which has been already set in it, and the identifying code 10 of the connected pipe 2 so that if a coincidence takes place therebetween, it displays "OK" mark, but unless so, an alarm means (lamp, buzzer and the like) permits an alarm to be issued. Furthermore, the detection switch such as the proximity switch 21 are connected to other control panel, thereby enabling their control to be performed in contact with th related control system.

The signal processing means 25, being not always limited to the afore-mentioned construction, may optionally take an arrangement of displaying the identifying code 10 simply in figure and character.

The construction, taken under the present embodiment, where the detection switch such as a plurality of proximity switches 21, 21 ... and the like are provided on the receiving part 4 and the repeated permutation or the assortment made by opening and closing contacts of a plurality of proximity switches 21, 21 ... permit the identifying code 10 of the pipe 2 to be set, will decrease relatively number of detection switches for the identification, even if there will be a necessity of identifying very many pipes 2, so in comparison with the arrangement of the afore-mentioned second conventional example where it is needed to provide a switch c one by one every one pipe a, in addition to a realization of larger cost-down in the actual number of parts, there are possibilities not only of simplifying the wiring of lead wires f with which the switch c and the outside are connected to each other but also of making the control panel for controlling the switch c as small as possible. In addition, there is found a merit in such a construction where the actual input number necessary for inputting the identifying code 10 into the reader 20 is decreased due to smaller number of needing and the detection switches.

Under the present embodiment an rearrangement of the connection instrument 3 will allow code number of the pipes to be changed.

(2nd embodiment)

Figure 4:
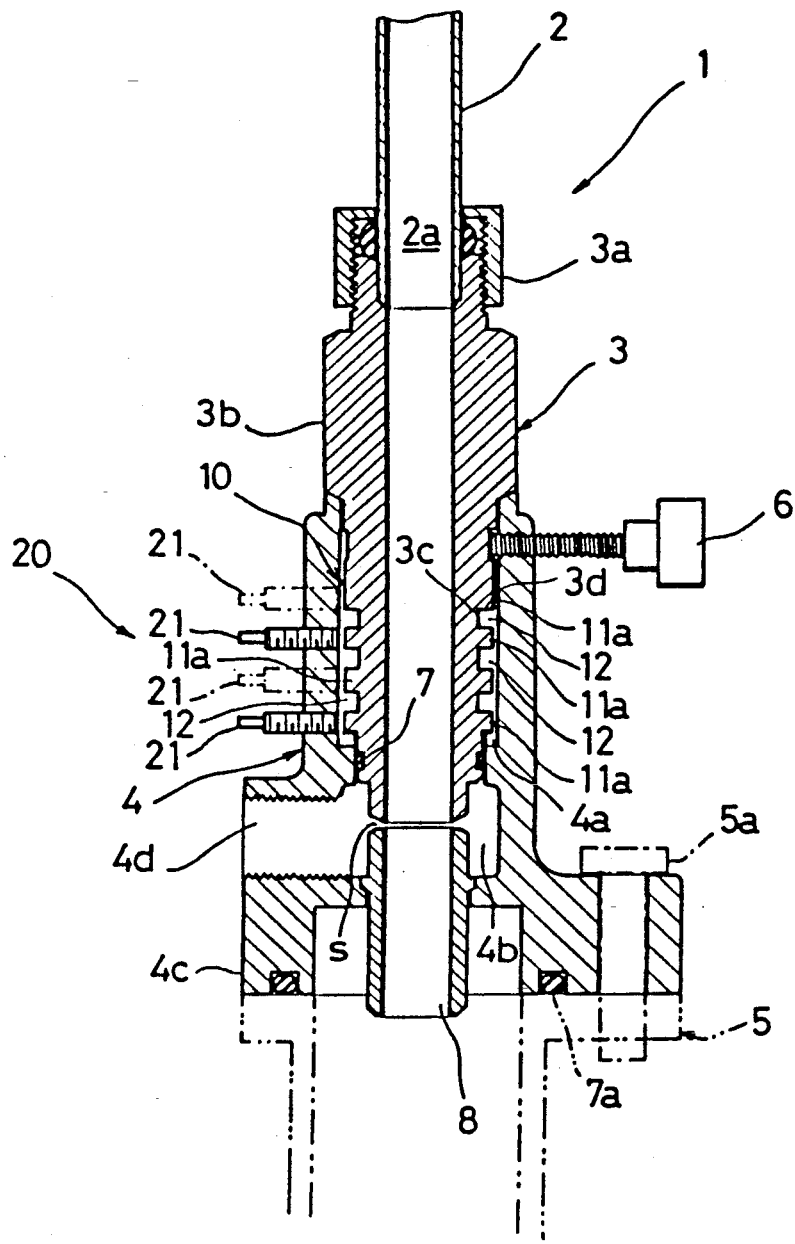

FIG. 4 illustrates the second embodiment. The characteristics of this embodiment lie in the points that while the magnetic rings 11a, 11a, ... are provided integrally to the outer periphery of the connection instrument 3, annular spaces 12, each of which is formed between the magnetic rings 11a and 11a, are adapted to correspond to the non-magnetic rings 11b, 11b, ... of the first embodiment, its other construction being similar to that of the first embodiment. According to the construction of the second embodiment, the identifying code 10 can be changed by replacing a pair of the connection instruments 3 which have a different code. However, it is not needed to prepare the magnetic ring 11a and the non-magnetic ring 11b, parts other than the connection instrument 3, or any separate parts including the snap ring 9 and the like, the resulting merit is that the actual number of parts is decreased, the productivity being enhanced.

The number, interval, shape, and permutation of the magnetic ring 11a and the annular space 12 corresponding to the non-magnetic ring 11b may be optional.

Figure 5:
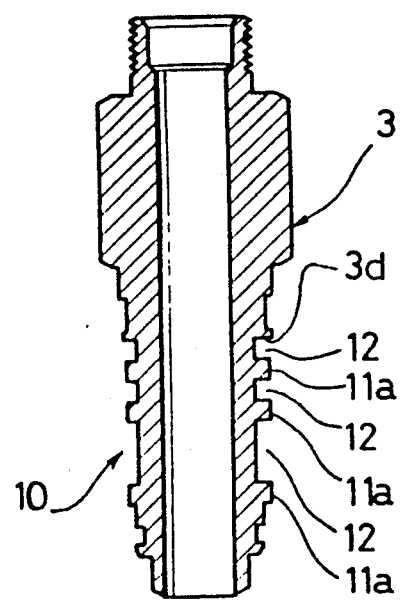
Figure 6:
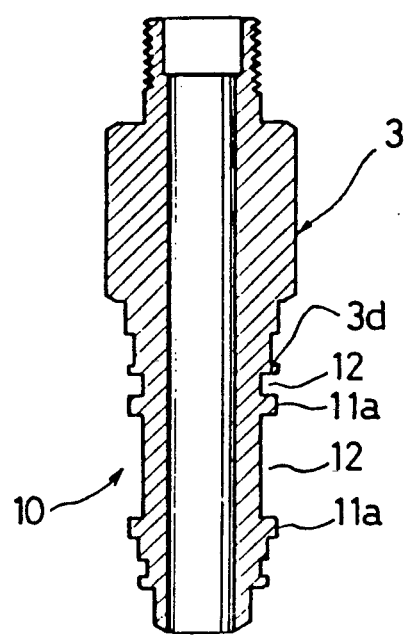
Figure 8:
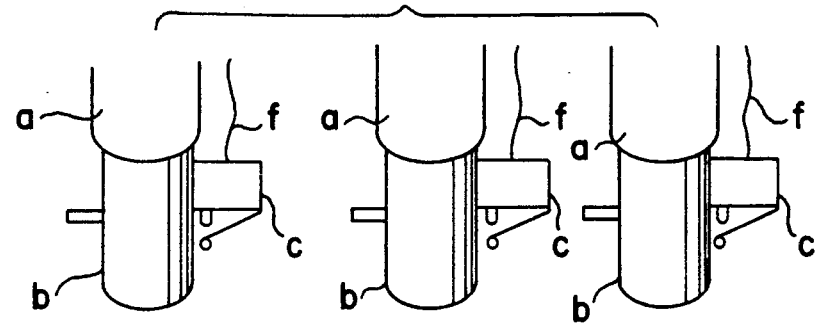
FIG. 8 is an exploded perspective view of the second conventional example.
Figure 9:
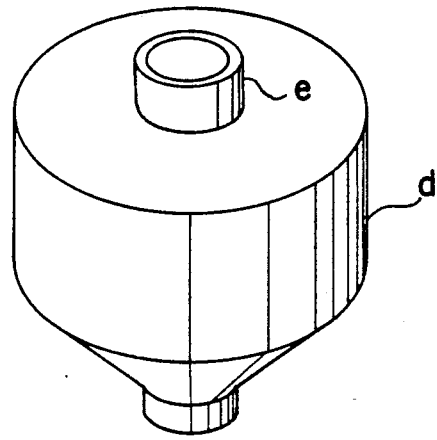
FIG. 9 is a longitudinal sectional view of a state of connecting the pipe and the receiving part to each other as illustrated in FIG. 8.
Figure 9:
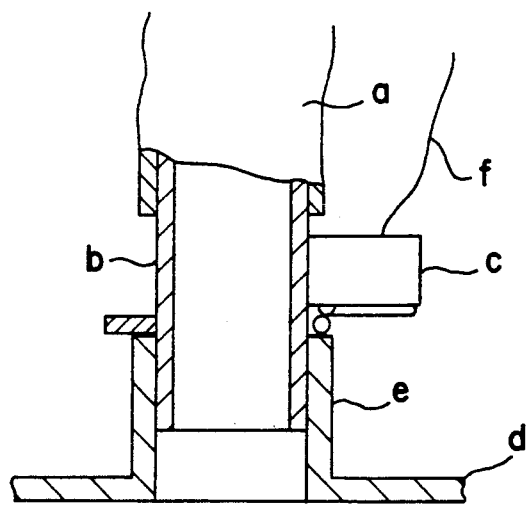

In FIG. 4, a formed line of the uppermost magnetic ring 11a and the annular space 12 being located next to such a magnetic ring 11a, which comprises finally an alternately repetition of such a pair of construction, includes in total 4 units (one of which is used for confirming the connection) of magnetic rings 11a and 3 units of annular spaces 12. Such a further possible arrangement as shown in FIG. 5 is that an order to read the magnetic ring 11a, the annular ring 12, the magnetic ring 11a with the annular ring 12 being located at the uppermost position being defined, 3 units (one of which is used for confirming the connection) of magnetic rings 11a and 3 units of annular spaces 12 are finally provided. A still further possible arrangement is, as shown in FIG. 6, that an order to read the annular space 12, the magnetic ring 11a, the annular space 12, and the magnetic ring 11a being defined, 2 units (one of which is used for confirming the connection) of magnetic rings 11a and 2 units of annular spaced 12 are finally provided.

What is claimed is:

1. A pipe identifying apparatus comprising:

a plurality of magnetic rings and non-magnetic rings which magnetic rings and non-magnetic rings form specific identifying codes for each of a plurality of pipes and are heaped up in respective positions in the longitudinal direction of the pipe itself or a connection instrument removably connected to the pipe; and proximity switches provided on the side of receiving part of the pipe itself or the connection instrument and associating with the magnetic rings to form a magnetic circuit, so that the magnetic circuit is closed to generate electric signals between each proximity switches and each of the plurality of magnetic rings and non-magnetic rings forming the identifying codes, thereby identifying specific connected pipes by means of the generated electric signals.

2. A pipe identifying apparatus as defined in claim 1, wherein the plurality of magnetic rings and non-magnetic rings forming the identifying codes may be selectively changed in combination.

3. A pipe identifying apparatus comprising:

a plurality of magnetic rings including convexed parts and annular spaces in concaved configuration forming non-magnetic elements which magnetic rings and annular spaces form specific identifying codes for each of a plurality of pipes and are formed integrally with and longitudinally of the pipe itself or a connection instrument removably connected to the pipe; and proximity switches provided on the side of receiving part of the pipe itself or the connection instrument and associating with the magnetic rings to form a magnetic circuit, so that the magnetic circuit is closed to generate electric signals between each proximity switches and each of the plurality of magnetic rings and the annular spaces forming the identifying codes, thereby identifying specific connected pipes by means of the generated electric signals.

4. A pipe identifying apparatus as defined in claim 1, wherein the magnetic ring placed at the utmost end is provided for checking that a pipe is completely fit into the receiving part.

5. A pipe identifying apparatus as defined in claim 2 or 3, wherein the magnetic ring placed at the utmost end is provided for checking that a pipe is completely fit into the receiving part.

* * * * *